US012572388B2

(12) United States Patent
Hu et al.

(10) Patent No.: US 12,572,388 B2
(45) Date of Patent: Mar. 10, 2026

(54) COMPUTING RESOURCE SCHEDULING BASED ON EXPECTED CYCLES

(71) Applicant: Lenovo (Beijing) Limited, Beijing (CN)

(72) Inventors: Yongdeng Hu, Beijing (CN); Hucheng Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 427 days.

(21) Appl. No.: 18/182,878

(22) Filed: Mar. 13, 2023

(65) Prior Publication Data

US 2023/0315528 A1     Oct. 5, 2023

(30) Foreign Application Priority Data

Mar. 31, 2022    (CN) .......................... 202210334595.9

(51) Int. Cl.
*G06F 9/50*         (2006.01)
*G06F 9/451*        (2018.01)
*G06F 11/34*        (2006.01)

(52) U.S. Cl.
CPC ............ *G06F 9/5033* (2013.01); *G06F 9/451* (2018.02); *G06F 11/3409* (2013.01)

(58) Field of Classification Search
CPC .... G06F 9/5033; G06F 9/451; G06F 11/3409; G06F 9/5044; G06F 9/505
See application file for complete search history.

(56) References Cited

U.S. PATENT DOCUMENTS

| | | | | |
|---|---|---|---|---|
| 9,692,663 B2 * | 6/2017 | Oberlin | ................ | H04L 41/5096 |
| 10,686,728 B2 * | 6/2020 | Hu | .......... | G06F 9/5033 |
| 2007/0234365 A1 * | 10/2007 | Savit | ........................ | G06F 9/505 |
| | | | | 718/104 |
| 2011/0225591 A1 * | 9/2011 | Wada | ..................... | G06F 9/4881 |
| | | | | 718/103 |
| 2012/0079480 A1 * | 3/2012 | Liu | ...................... | H04L 43/0876 |
| | | | | 718/1 |
| 2012/0266163 A1 * | 10/2012 | Durham | ................ | G06F 9/5088 |
| | | | | 718/1 |
| 2014/0379924 A1 * | 12/2014 | Das | .......................... | H04L 47/72 |
| | | | | 709/226 |
| 2016/0170438 A1 * | 6/2016 | Wu | ...................... | G06F 9/30087 |
| | | | | 713/400 |
| 2019/0317826 A1 * | 10/2019 | Jain | ........................ | G06F 9/5077 |
| 2020/0210228 A1 * | 7/2020 | Wu | ......................... | G06F 9/4881 |
| 2021/0160191 A1 * | 5/2021 | Ghosh | ................... | H04L 41/145 |

* cited by examiner

*Primary Examiner* — Benjamin C Wu
(74) *Attorney, Agent, or Firm* — ANOVA LAW GROUP, PLLC

(57)          ABSTRACT
A computing resource scheduling method includes determining expected cycle numbers of computing resources used in an application scenario based on a first condition and a second condition, and scheduling the computing resources in a remaining available time period according to the expected cycle numbers of the computing resources. The first condition includes that the computing resources are operated according to the expected cycle numbers to have a utilization rate of a remaining available object to be greater than a target utilization rate. The second condition includes that a total performance of the computing resources meets a threshold value when the computing resources are operated according to the expected cycle numbers, and a performance of any one computing resource is positively correlated with computing power of the computing resource.

20 Claims, 3 Drawing Sheets

S201

Obtain total performance of the computing resources being operated according to the expected cycle numbers

S202

Determine target performance of a single period within the remaining available time period according to the total performance

S203

With a goal that performance of a single cycle when the computing resources are operated in the remaining available time period approaches the target performance, assign cycles of the corresponding expected cycle numbers to the computing resources within the remaining available time period

S101

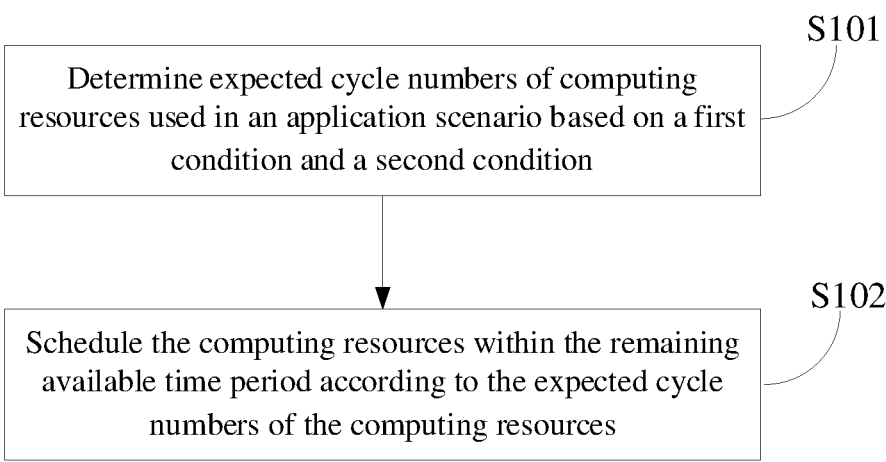

Determine expected cycle numbers of computing resources used in an application scenario based on a first condition and a second condition

S102

Schedule the computing resources within the remaining available time period according to the expected cycle numbers of the computing resources

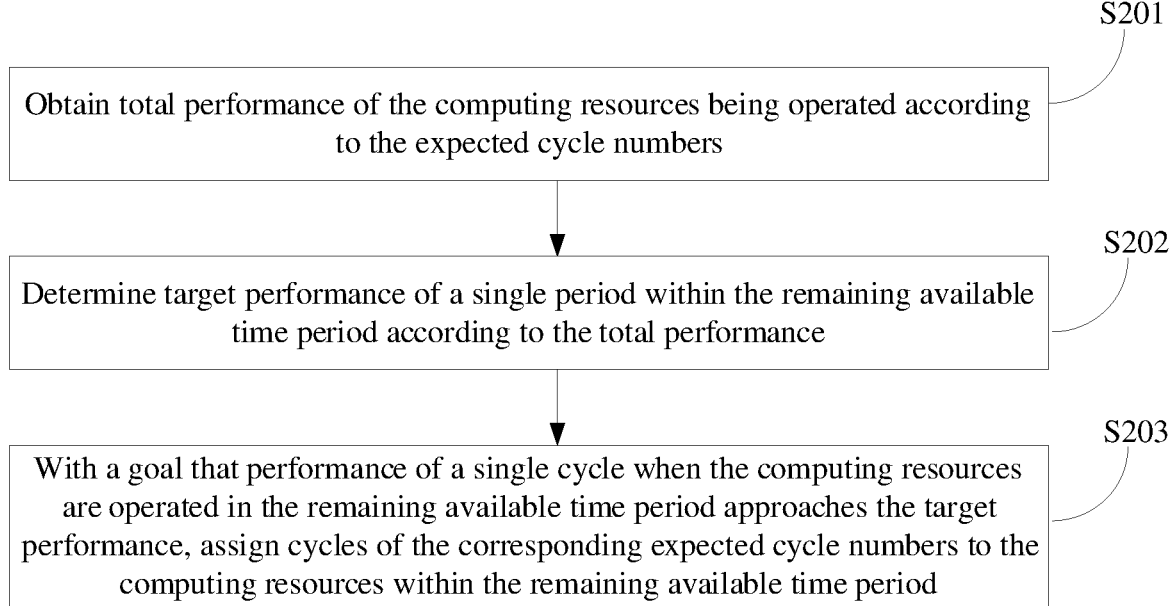

Obtain total performance of the computing resources being operated according to the expected cycle numbers

S202

Determine target performance of a single period within the remaining available time period according to the total performance

S203

With a goal that performance of a single cycle when the computing resources are operated in the remaining available time period approaches the target performance, assign cycles of the corresponding expected cycle numbers to the computing resources within the remaining available time period

FIG. 2

COMPUTING RESOURCE SCHEDULING BASED ON EXPECTED CYCLES

CROSS-REFERENCE TO RELATED APPLICATION

This application claims priority to Chinese Patent Application No. 202210334595.9, filed on Mar. 31, 2022, the entire content of which is incorporated herein by reference.

TECHNICAL FIELD

The present disclosure relates to the cloud computation technology field and, more particularly, to a computing resource scheduling method, device, an electronic apparatus, and a storage medium.

BACKGROUND

Cloud computing is a pay-by-use model that provides available, convenient, and on-demand network access to a configurable resource-sharing pool (resources include networks, servers, storage, application software, and services). These resources can be provided quickly with little administrative effort or interaction with a service provider.

However, at present, computing resources can only be scheduled for a user according to computing resources ordered by the user. That is, the computing resources are scheduled for the user for the number of computing resources that are ordered by the user. The intelligence of computing resource scheduling is poor.

SUMMARY

Embodiments of the present disclosure provide a computing resource scheduling method. The method includes determining expected cycle numbers of computing resources used in an application scenario based on a first condition and a second condition and scheduling the computing resources in a remaining available time period according to the expected cycle numbers of the computing resources. The first condition includes that the computing resources are operated according to the expected cycle numbers to have a utilization rate of a remaining available object to be greater than a target utilization rate. The second condition includes that the total performance of the computing resources meets a threshold value when the computing resources are operated according to the expected cycle numbers, and the performance of any one computing resource is positively correlated with the computing power of the computing resource.

Embodiments of the present disclosure provide a computing resource scheduling device, including a determination module and a scheduling module. The determination module is configured to determine expected cycle numbers of computing resources used in an application scenario based on a first condition and a second condition. The first condition includes that the computing resources are operated according to the expected cycle numbers to have a utilization rate of a remaining available object to be greater than a target utilization rate. The second condition includes that the total performance of the computing resources meets a threshold value when the computing resources are operated according to the expected cycle numbers, and the performance of any one computing resource is positively correlated with the computing power of the computing resource. The scheduling module is configured to schedule on the computing resources in a remaining available time period according to the expected cycle numbers of the computing resources.

Embodiments of the present disclosure provide an electronic apparatus, including a processor and a memory. The memory stores a program that, when executed by the processor, causes the processor to determine expected cycle numbers of computing resources used in an application scenario based on a first condition and a second condition and schedule the computing resources in a remaining available time period according to the expected cycle numbers of the computing resources. The first condition includes that the computing resources are operated according to the expected cycle numbers to have a utilization rate of a remaining available object to be greater than a target utilization rate. The second condition includes that total performance of the computing resources meets a threshold value when the computing resources are operated according to the expected cycle numbers, and a performance of any one computing resource is positively correlated with computing power of the computing resource. The scheduling module is configured to schedule on the computing resources in a remaining available time period according to the expected cycle numbers of the computing resources.

BRIEF DESCRIPTION OF THE DRAWINGS

FIG. 1 illustrates a schematic flowchart of a computing resource scheduling method according to some embodiments of the present disclosure.

FIG. 2 illustrates a schematic flowchart of scheduling computing resources within a remaining available time period according to expected cycle numbers of the computing resources according to some embodiments of the present disclosure.

Figure 3:
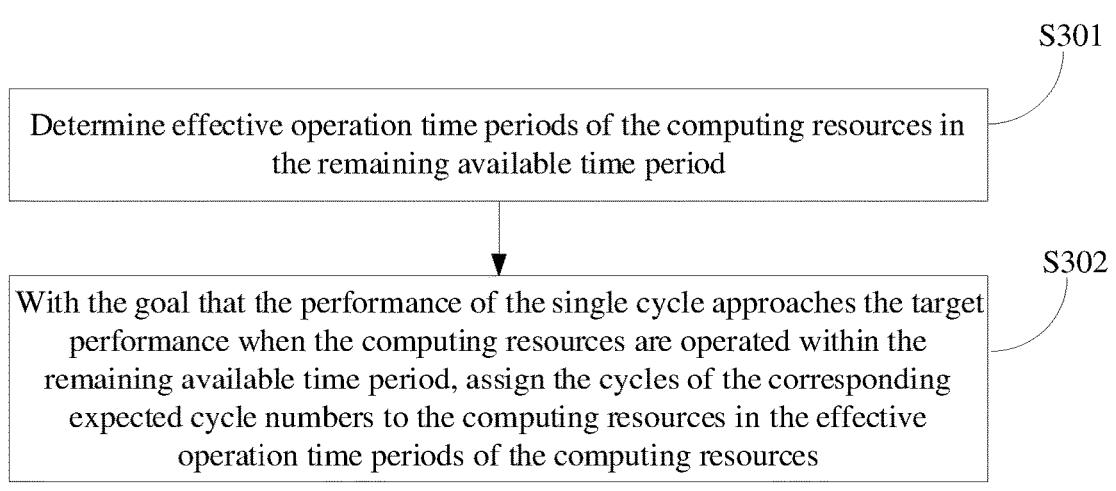
FIG. 3 illustrates another schematic flowchart of scheduling computing resources within a remaining available time period according to expected cycle numbers of the computing resources according to some embodiments of the present disclosure.

The terms "first," "second," "third," "fourth," etc., (if any) in the description, claims, and the above drawings are used to distinguish similar parts and not necessarily to describe specific sequence or order. The data described with the terms are interchangeable under appropriate situations. Thus, embodiments of the present disclosure described herein can be implemented in a sequence other than those illustrated here.

DETAILED DESCRIPTION OF THE EMBODIMENTS

The technical solutions of embodiments of the present disclosure are described in detail in connection with the accompanying drawings of embodiments of the present disclosure. Apparently, described embodiments are only some embodiments of the present disclosure, not all embodiments. Based on embodiments of the present disclosure, all other embodiments obtained by those of ordinary skill in the art without creative efforts should be within the scope of the present disclosure.

A computing resource scheduling method of embodiments of the present disclosure can be used in a cloud container platform. The cloud container platform can provide various virtual computing resources (i.e., computing resources), which can at least include but are not limited to, a central processing unit/processor (CPU), a graphics processing unit (GPU), a tensor processing unit (TPU), a neural network processing unit (NPU), a deep learning processing unit (DPU), an accelerated processing unit (APU), a floating processing unit (FPU), a holographic processing unit (HPU), an intelligence processing unit (IPU), and a vector processing unit (VPU), etc.

Computing resources of a same type can be further divided according to a performance level. For example, CPU can be classified into low-frequency CPU and high-frequency CPU.

FIG. 1 illustrates a schematic flowchart of a computing resource scheduling method according to some embodiments of the present disclosure. The method includes the following processes.

At S101, expected cycle numbers of computing resources used in an application scenario are determined based on a first condition and a second condition.

The first condition can include that the computing resources are operated according to expected cycle numbers, and a utilization rate of a remaining available object is greater than a target utilization rate. That is, in the first condition, the computing resources can be required to be operated according to the expected cycle numbers, and the user objects need to be close to the remaining available object. An available object can refer to an object consumed by operating the computing resources. For example, the remaining available object can include the remaining budget.

The second condition can include that when the computing resources are operated according to the expected cycle numbers, the total performance of the computing resources satisfies a threshold value, and performance of any one computing resource is positively correlated with computing power of the computing resource. That is, the stronger the computing power of a computing resource, the better the performance of the computing resource is. For example, in the second condition, based on satisfying the first condition, the total performance can be optimal when the computing resources are operated according to the expected cycle numbers.

For example, when the computing resources are operated according to the expected cycle numbers, the total performance of the computing resources can be a weighted sum of the performances of the computing resources. A weight of the performance of each computing resource can be an expected cycle number of the computing resource.

The application scenario can refer to an application scenario to which an application program or service of the currently used cloud computing resource belongs. The application scenario can include but is not limited to any one of a non-computing-intensive scenario (e.g., a high-concurrency scenario), and a computer vision scenario. Computing resources corresponding to different application scenarios can be different. For example, in a computer vision (CV) scenario, a corresponding computing resource can include but is not limited to TPU, GPU, high-frequency CPU, and low-frequency CPU. In a high-concurrency scenario, a computing resource can only include a high-frequency CPU and a low-frequency CPU.

For example, one day can be used as a cycle, or a cycle can also be other time lengths. For example, every two days can be a cycle.

At S102, the computing resources are scheduled within the remaining available time period according to the expected cycle numbers of the computing resources.

The remaining available time period can be determined according to an initial available time period and a used time period. Apparently, the remaining available time period can refer to an unused time period in the initial available time period. For example, the initial available time period can be from 2021 Jan. 1 to 2021 Dec. 31, the used time period can be 2021 Jan. 1 to 2021 Jun. 30, and the remaining available time period can be 2021 Jul. 1 to 2021 Dec. 31.

When the computing resources are scheduled within the remaining available time period, the cycle number occupied by the computing resources can be the determined expected cycle number. For any one computing resource (denoted as computing resource A), the computing resource A can be operated in cycles in the remaining available time period or only in some cycles of the remaining available time period, as long as a sum of operation time lengths of computing resource A in the cycles is ensured to be a time length corresponding to the expected cycle number of the computing resource.

In some embodiments, when the computing resources are scheduled within the remaining available time period, the computing resources can be scheduled based on the total performance of the computing resources being same or substantially the same in various cycles.

In the computing resource scheduling method of embodiments of the present disclosure, the expected cycle numbers of the computing resources used in the application scenario can be determined according to the first condition and the second condition. According to the expected cycle numbers of the computing resources, the computing resources can be scheduled in the remaining available time period. Since the expected cycle number of the computing resource is calculated by operating the computing resources according to the expected cycle numbers with the target of the utilization rate of the remaining available object being greater than the target utilization rate and the total performance satisfying the threshold value. Thus, the computing resources can be scheduled in the remaining available time period according to the expected cycle numbers of the computing resources to dynamically schedule the computing resources based on the remaining available object and the remaining available time period. Therefore, the utilization rate of the available object can be relatively large when the available time period ends, the performance of the scheduled computing resources can be good, and the intelligence of scheduling the computing resources can be improved.

In some embodiments, FIG. 2 illustrates a schematic flowchart of scheduling the computing resources within a remaining available time period according to the expected cycle numbers of the computing resources according to some embodiments of the present disclosure. The method can include the following processes.

At S201, the total performance of the computing resources being operated according to the expected cycle numbers is obtained.

For example, the total performance of the computing resources being operated according to the expected cycle numbers can be a weighted sum of the performance of the computing resources. A weight of the performance of each computing resource can be an expected cycle number of the computing resource.

At S202, a target performance of a single period within the remaining available time period is determined according to the total performance.

In some embodiments, a ratio of the total performance to the cycle number included in the remaining available time period can be determined as a target performance of a single cycle in the remaining available time period.

At S203, with a goal that the performance of a single cycle when the computing resources are operated in the remaining available time period approaches the target performance, cycles of the corresponding expected cycle numbers are assigned to the computing resources within the remaining available time period.

That is, when the computing resources are scheduled within the remaining available time period, the total performance of the computing resources being operated in the single cycle may need to be caused to approach the target performance.

In some embodiments, corresponding to an i-th (i=1, 2, 3, . . . , N) cycle in the remaining available time period, a weighted sum of performances of the computing resources in the i-th cycle can be obtained. A j-th (j=1, 2, 3, . . . , M) computing resource corresponding to a weight $x_{ij}$ of the i-th cycle can be an operation time length of the j-th computing resource in the i-th cycle.

Based on the sum of operation time lengths of the j-th computing resource in cycles is equal to a time length corresponding to the expected cycle number of the j-th computing resource, and an absolute value of a difference between the weighted sum of the performances of the computing resources in the i-th cycle and the target performance being smaller than the threshold value, the operation time length $x_{ij}$ of the j-th computing resource in the i-th cycle can be determined.

N can be a number of cycles in the remaining available time period, and M can be the number of computing resources.

In some embodiments, the computing resource can have an effective operation time period. For example, some resources can only be used between 11:00 and 6:00 in the evening, and some resources can only be used on weekdays. Therefore, when the computing resources are scheduled in the remaining available time period, an effective operation time period for the computing resources may need to be considered. Based on this, FIG. 3 illustrates another schematic flowchart of scheduling the computing resources within the remaining available time period according to the expected cycle numbers of the computing resources according to some embodiments of the present disclosure. The method includes the following processes.

At S301, effective operation time periods of the computing resources are determined in the remaining available time period.

In some embodiments, the effective operation time periods of the computing resources within the remaining available time period can be determined according to a correspondence between the predetermined computing resources and the effective operation time periods.

At S302, with the goal that a performance of a single cycle approaches the target performance when the computing resources are operated within the remaining available time period, cycles of the corresponding expected cycle numbers are assigned to the computing resources in the effective operation time periods of the computing resources.

When the computing resources are scheduled within the remaining available time period, each computing resource can only be operated within the corresponding effective operation time period.

For example, a sum of the operation time lengths of the j-th computing resource in the cycles can be equal to a time length corresponding to the expected cycle number of the j-th computing resource. An absolute value of a difference between a weighted sum of performances of the computing resources in the i-th cycle and the target performance can be smaller than the threshold value. An operation time length of the j-th computing resource in the i-th cycle can be smaller than or equal to a time length of an effective operation time period of the j-th computing resource in the i-th cycle. Then, an operation time length of the j-th computing resource in the i-th cycle can be determined.

In some embodiments, the performances of the computing resources in the application scenario can be obtained by statistically analyzing time consumed by the computing resources to process same sample data in the application scenario. The sample data can be small sample data.

The performance of any one computing resource can be negatively correlated with the time consumed by the computing resource to process the sample data. That is, the longer the time consumed by the computing resource to process the sample data, the lower the performance is.

For example, the performance of the computing resource can be time efficiency of the computing resource. The higher the time efficiency is, the higher the performance representing the computing resource is, and the lower the time efficiency is, the lower the performance representing the computing resource is. Therefore, the time efficiency of any one computing resource can be positively correlated with the computing power of the computing resource. That is, the stronger the computing power of the computing resource is, the higher the time efficiency is.

The time efficiency of computing resources can be obtained by statistically analyzing the time consumed by the computing resources to process the same sample data in the application scenario.

For example, in a certain CV scenario, TPU, GPU, high-frequency CPU, and low-frequency CPU can be used. The time consumed by TPU, GPU, high-frequency CPU, and low-frequency CPU to process the same sample data in the certain CV scenario and the corresponding time efficiencies are shown in Table 1.

TABLE 1

| Computing resource type | Time (consumed by small sample) | Time efficiency |
|---|---|---|
| TPU | 2 | 15 |
| GPU | 5 | 6 |
| High-frequency CPU | 10 | 3 |
| Low-frequency CPU | 30 | 1 |

Obviously, the time consumed by the low-frequency CPU to process the small sample data is the longest, and the time efficiency is lowest. The time consumed by the TPU to process the same small sample data is the shortest, and the time efficiency is the highest.

For example, in a non-calculation-intensive scenario, such as a high-concurrency scenario, only the high-frequency CPU and the low-frequency CPU can be used. The time consumed by the high-frequency CPU and the low-frequency CPU to process the same sample data and the corresponding time efficiencies are shown in Table 2.

TABLE 2

| Computing resource type | Time (consumed by small sample) | Time efficiency |
|---|---|---|
| High-frequency CPU | 1 | 3 |
| Low-frequency CPU | 3 | 1 |

Obviously, the time consumed by the low-frequency CPU to process the small-sample data is longer than the time consumed by the high-frequency CPU to process the small-sample data. Therefore, the time efficiency of the low-frequency CPU is lower than the time efficiency of the high-frequency CPU.

In some embodiments, the information processing method of embodiments of the present disclosure can further include displaying a user interface and receiving an inputted target available time period and a target number of the available objects through the user interface.

After obtaining the target available time period and the target number of the available objects, the computing resources can be scheduled based on a computing resource allocation method of the present disclosure. Based on the present disclosure, the user can only need to input the application time period of the computing resources as needed and the target number of the available objects, the computing resource scheduling method with the optimal performance adapting to the input target available time period and the target number of the available objects can be implemented. Thus, the difficulty for the user to select the computing resources can be reduced.

For example, the target available time period can represent the application time length of the computing resources. The target number of the available objects can refer to cost (i.e., budget) for purchasing the computing resources.

In connection with Table 3, taking the performance of the computing resource as the time efficiency of the computing resource as an example, an implementation method for determining the expected cycle number of the computing resources used in the application scenario based on the first condition and the second condition is described.

With reference to Table 3, the expected cycle numbers of the computing resources shown in Table 1 are as follows. The expected cycle number of the TPU is denoted as X1. The expected cycle number of the GPU is denoted as X2. The expected cycle number of the high-frequency CPU is denoted as X3. The expected cycle number of the low-frequency CPU is denoted as X4. Utilization rates of TPU, GPU, high-frequency CPU, and low-frequency CPU on the available objects (if the available object is fee, the utilization rate of the available object can be the price of a single cycle) are 20, 10, 5, and 2.

TABLE 3

| Computing resource type | Price of single cycle (1 Core) | Time efficiency | Expected cycle number (1 Core) |
|---|---|---|---|
| TPU | 20 | 15 | X1 |
| GPU | 10 | 6 | X2 |
| High-frequency CPU | 5 | 3 | X3 |
| Low-frequency CPU | 2 | 1 | X4 |

The price of a single cycle in Table 3 can refer to the price of the single cycle of 1 core computing resource. For example, the price of the single cycle of 1coreTPU is 20, and the price of the single cycle of 1coreGPU is 10.

In some embodiments, used fee can be determined according to usage parameters of the computing resources (including which computing resources are used, the time length of use, etc.). Current remaining fee denoted as Y can be obtained by subtracting the used fee from the total fee.

Assume that N cycles exist in the current remaining available time period.

The fee y used by the computing resources shown in Table 3 to operate according to the corresponding expected cycle numbers can be represented by the following formula.

$$y = 20 \times X1 + 10 \times X2 + 5 \times X3 + 2 \times X4$$

The total time efficiency e of the computing resources operating according to the corresponding expected cycle numbers shown in Table 3 can be represented as follows.

$$e = 15 \times X1 + 6 \times X2 + 3 \times X3 + 1 \times X4$$

In the present disclosure, based on y being equal to Y and e having a maximum value, values of X1, X2, X3, and X4 can be obtained. In some other embodiments, based on a difference between Y and y being smaller than the threshold value, and e having the maximum value, the values of X1, X2, X3, and X4 can be obtained.

The maximum value of e can be divided by N to obtain a target time efficiency (denoted as eo) of the cycles in the remaining available time period.

Corresponding to the i-th (i=1, 2, 3, . . . , N) cycle in the remaining available time period, the weighted sum of the time efficiencies of the computing resources in the i-th cycle (denoted as ei) can be obtained as follows.

$$ei = 15 \times xi1 + 6 \times xi2 + 3 \times xi3 + 1 \times xi4$$

xij (j=1, 2, 3, 4) can represent the operation time length of the j-th computing resource in the i-th cycle.

The sum of the operation time length of the j-th computing resource in the cycles (denoted as Tj) can be represented by the following formula.

$$Tj = \sum_{i=1}^{N} xij$$

Without considering the effective operation time period of the computing resources, the value of xij can be determined based on Tj=Xj and ei=eo, or based on Tj=Xj and an absolute value of a difference between ei and eo being less than the threshold value.

Considering the effective operation time period of the computing resources, assume that the effective operation time period of the j-th computing resource in the i-th cycle is tij, the value of xij can be determined based on Tj=Xj, xij being less than or equal to tij, and ei=eo, or based on Tj=Xj, xij being less than or equal to tij, and the absolute value of the difference between ei and eo being less than the threshold value.

As shown in Table 3, the prices of the single cycle of the computing resources are calculated according to 1 core. In practical applications, a computing resource can require a plurality of cores to perform operations simultaneously. Thus, for the j-th computing resource, according to a number K cores actually used by the j-th computing resource in the i-th cycle, the usage time length of the j-th computing resource in the i-th cycle can be divided into K sub-time lengths on average. The operation time length of each core of the j-th computing resource in the i-th cycle can be one of the sub-time lengths.

Figure 4:
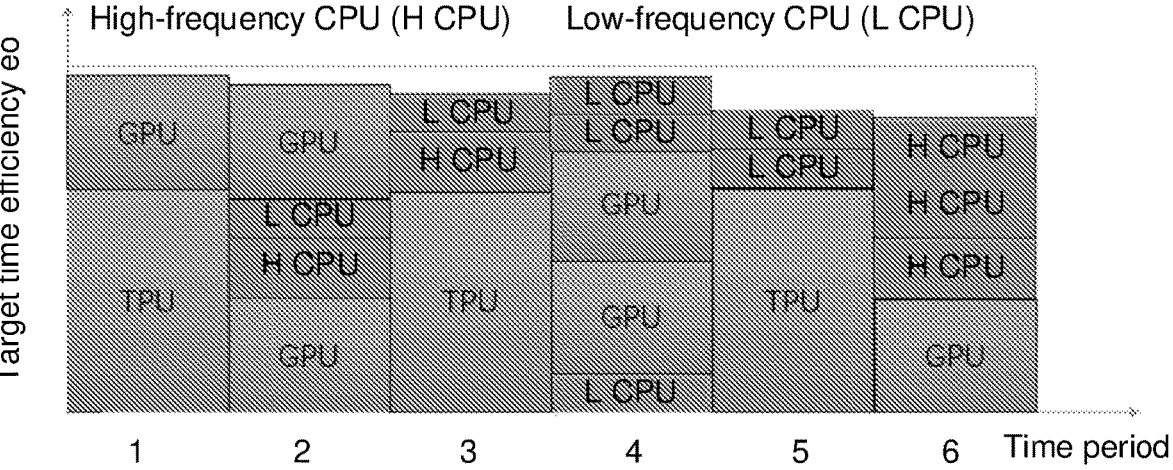
FIG. 4 illustrates a schematic diagram showing scheduling computing resources within a remaining available time period according to expected cycle numbers of the computing resources according to some embodiments of the present disclosure.

FIG. 4 illustrates a schematic diagram showing scheduling the computing resources within the remaining available time period according to the expected cycle numbers of the computing resources according to some embodiments of the present disclosure. As shown in FIG. 4, the remaining available time period includes 6 cycles. In the i-th cycle, a height of the j-th computing resource represents a total time efficiency when the j-th computing resource is operated according to the operation time length in the i-th cycle. efficiency. In a first cycle, 1-core GPU and 1-core TPU can be operated. In a second cycle, 2-core GPU, 1-core low-frequency CPU, and 1-core high-frequency CPU can be operated. In a third cycle, 1-core low-frequency CPU, 1-core high-frequency CPU, and 1-core TPU can be operated. In a fourth cycle, 2-core low-frequency CPU, 2-core GPU, and 1-core low-frequency CPU can be operated. In a fifth cycle, 2-core low-frequency CPU and 1-core TPU can be operated, In a sixth cycle, 3-core high-frequency CPU and 1-core CPU can be operated.

The computing resource scheduling method of the present disclosure can be used to build a private cloud service.

Figure 5:
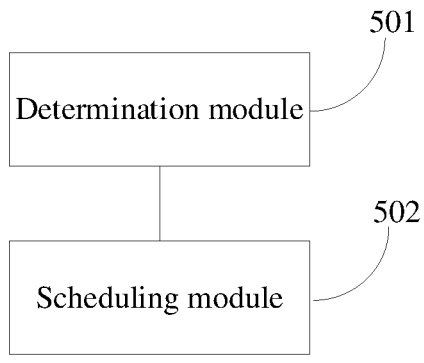
FIG. 5 illustrates a schematic structural diagram of a computing resource scheduling device according to some embodiments of the present disclosure.

Corresponding to method embodiments, embodiments of the present disclosure also provide a computing resource scheduling device. FIG. 5 illustrates a schematic structural diagram of a computing resource scheduling device according to some embodiments of the present disclosure. The device includes a determination module 501 and a scheduling module 502.

The determination module 501 can be configured to determine the expected cycle numbers of the computing resources used in the application scenario based on the first condition and the second condition. The first condition can include that the computing resources are operated according to expected cycle numbers, and the utilization rate of a remaining available object is greater than the target utilization rate. The second condition can include that when the computing resources are operated according to the expected cycle numbers, the total performance of the computing resources satisfies a threshold value, and the performance of any one computing resource is positively correlated with the computing power of the computing resource.

The scheduling module 502 can be configured to schedule on the computing resources within the remaining available time period according to the expected cycle numbers of the computing resources.

In the computing resource scheduling device of embodiments of the present disclosure, the computing resources can be scheduled in the remaining available time period according to the expected cycle numbers of the computing resources. Since the expected cycle numbers of the computing resources are calculated by operating the computing resources according to the expected cycle numbers with the goal of the utilization rate of the remaining available object being greater than the target utilization rate and the total performance satisfying the threshold value. Thus, the computing resources can be scheduled in the remaining available time period according to the expected cycle numbers of the computing resources to dynamically schedule the computing resources based on the remaining available object and the remaining available time period. Therefore, the utilization rate of the available object can be relatively large when the available time period ends, the performance of the scheduled computing resources can be good, and the intelligence of scheduling the computing resources can be improved.

In some embodiments, the scheduling module 502 can be configured to obtain the total performance of the computing resources being operated according to the expected cycle numbers, determine a target performance of a single period within the remaining available time period according to the total performance, and with a goal that performance of a single cycle when the computing resources are operated in the remaining available time period approaches the target performance, assign cycles of the corresponding expected cycle numbers to the computing resources within the remaining available time period.

In some embodiments, when determining the target performance of the single cycle in the remaining available time period according to the total performance, the scheduling module 502 can be configured to determine the ratio of the total performance to the cycle number included in the remaining available time period as the target performance of the single cycle in the remaining available time period.

In some embodiments, the goal includes that the performance of the single cycle when the computing resources are operated in the remaining available time period approaches the target performance. When the cycles of the corresponding expected cycle number are assigned to the computing resources in the remaining available time period, the scheduling module 502 can be configured to determine effective operation time periods of the computing resources within the remaining available time period, and with the goal that the performance of the single cycle when the computing resources are operated in the remaining available time period approaches the target performance, assign the cycles of the corresponding expected cycle number to the computing resources in the effective operation time periods of the computing resources.

In some embodiments, the performances of the computing resources in the application scenario can be obtained by statistically analyzing the time consumed by the computing resources to process the same sample data in the application scenario.

The performance of any one computing resource can be negatively correlated with the time consumed by the computing resource to process the sample data.

In some embodiments, the total performance of the computing resources when the computing resources are operated according to the expected cycle numbers can be the weighted sum of the performances of the computing resources.

The weight of the performance of any one computing resource can be the expected cycle number of the computing resource.

In some embodiments, the computing resource scheduling device of the present disclosure can further include an interactive module. The interactive module can be configured to display the user interface and receive the inputted target available time period and target number of the available objects through the user interface.

Figure 6:
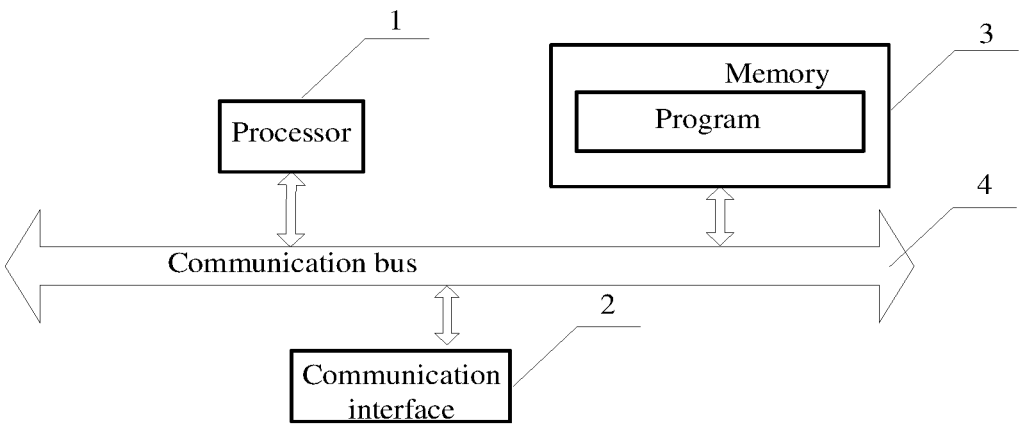
FIG. 6 illustrates a schematic structural diagram of an electronic apparatus according to some embodiments of the present disclosure.

Corresponding to method embodiments, the present disclosure also provides an electronic apparatus, which can include a cloud server. FIG. 6 illustrates a schematic structural diagram of the electronic apparatus according to some embodiments of the present disclosure. The electronic apparatus includes at least one processor 1, at least one communication interface 2, at least one memory 3, and at least one communication bus 4.

In embodiments of the present disclosure, at least one processor 1, at least one communication interface 2, at least one memory 3, and at least one communication bus 4 can be provided. The processor 1, the communication interface 2, and the memory 3 can communicate with each other through the communication bus 4.

The processor 1 can include a CPU, an application specific integrated circuit (ASIC), or one or more integrated circuits configured to implement embodiments of the present disclosure.

The memory 3 can include a high-speed RAM memory or a non-volatile memory, for example, at least one magnetic disk memory.

The memory 3 can store a program. The processor 1 can call the program stored in the memory 3. When the program is executed, the processor 1 can be configured to determine the expected cycle numbers of the computing resources used in the application scenario based on the first condition and the second condition. The first condition can include that the computing resources are operated according to expected cycle numbers, and the utilization rate of the remaining available object is greater than the target utilization rate. The second condition can include that when the computing resources are operated according to the expected cycle numbers, the total performance of the computing resources satisfies the threshold value, and the performance of any one computing resource is positively correlated with the computing power of the computing resource.

The processor 1 can be further configured to schedule on the computing resources within the remaining available time period according to the expected cycle numbers of the computing resources.

In some embodiments, for detailed functions and extended functions of the program, reference can be made to the above description.

Embodiments of the present disclosure also provide a storage medium storing a program that, when executed by the processor, causes the processor to determine the expected cycle numbers of the computing resources used in the application scenario based on the first condition and the second condition. The first condition can include that the computing resources are operated according to the expected cycle numbers, and the utilization rate of the remaining available object is greater than the target utilization rate. The second condition can include that when the computing resources are operated according to the expected cycle numbers, the total performance of the computing resources satisfies the threshold value, and the performance of any one computing resource is positively correlated with the computing power of the computing resource.

The processor can be further configured to schedule on the computing resources within the remaining available time period according to the expected cycle numbers of the computing resources.

In some embodiments, for detailed functions and extended functions of the program, reference can be made to the above description.

Those skilled in the art can know that the units and algorithm steps of the examples described in connection with embodiments of the present disclosure can be implemented by electronic hardware or a combination of computer software and electronic hardware. Whether the functions are executed by hardware or software depends on the specific application and design constraints of the technical solution. Those skilled in the art can use different methods to implement the described functions for each specific application. However, such an implementation should not be regarded as exceeding the scope of the present disclosure.

In some embodiments of the present disclosure, the disclosed system, device, and method can be implemented in other manners. In addition, the mutual coupling, direct coupling, or communication connection shown or discussed can be through some interfaces. The indirect coupling or communication connection of devices or units can be in an electrical, mechanical, or another form.

The units described as separate components may or may not be physically separated. The components displayed as the units may or may not be physical units. That is, the components can be located in one place, or can be distributed to a plurality of network units. Some or all of the units can be selected according to actual needs to achieve the purpose of the solution of embodiments of the present disclosure.

In addition, the functional units of embodiments of the present disclosure can be integrated into one processing unit. In some embodiments, the units can exist separately and physically. In some other embodiments, two or more units can be integrated into one unit.

In embodiments of the present disclosure, the independent claims, embodiments, and features can be combined with each other to solve the above technical problem.

If the described functions are realized in the form of a software functional unit and sold or used as an independent product, the functions can be stored in a computer-readable storage medium. Based on this understanding, in the technical solution of the present disclosure, the essence of the technical solution, a part of the technical solution that contributes to the existing technology, or a part of the technical solution can be embodied in the form of a software product. The computer software product can be stored in a storage medium, including several instructions that, when executed by the processor, cause the computer apparatus (e.g., a personal computer, a server, or a network apparatus) to execute all or part of the steps of the methods of embodiments of the present disclosure. The above storage medium can include a medium storing program codes, such as a U disk, a mobile hard disk, a read-only memory (ROM), a random access memory (RAM), a magnetic disk, or an optical disk.

The above description of embodiments of the present disclosure is provided to enable those skilled in the art to make or use the present disclosure. Various modifications to these embodiments can be apparent to those skilled in the art. The general principles defined here can be implemented in other embodiments without departing from the spirit or scope of the present disclosure. Therefore, the present disclosure is not limited to embodiments of the present disclosure, but is subjected to the widest scope consistent with the principles and novel features of the present disclosure.

What is claimed is:

1. A computing resource scheduling method, comprising:
determining expected cycle numbers of computing resources used in an application scenario based on a first condition and a second condition, the first condition including that the computing resources are operated according to the expected cycle numbers to have an utilization rate of a remaining available object to be greater than a target utilization rate, and the second condition including that a total performance of the computing resources meets a threshold value when the computing resources are operated according to the expected cycle numbers, and a performance of any one computing resource is positively correlated with computing power of the computing resource; and
scheduling and operating the computing resources in a remaining available time period according to the expected cycle numbers of the computing resources.

2. The method according to claim 1, wherein scheduling and operating the computing resources in the remaining available time period according to the expected cycle numbers of the computing resources includes:

obtaining the total performance of the computing resources when being operated according to the expected cycle numbers;

determining the target performance of a single cycle within the remaining available time period according to the total performance; and with a goal that the performance of the single cycle when the computing resources are operated in the remaining available time period approaches the target performance, assigning cycles of the corresponding expected cycle numbers to the computing resource within the remaining available time period.

3. The method according to claim 2, wherein determining the target performance of the single cycle within the remaining available time period according to the total performance includes:

determining a ratio of the total performance to a number of cycles included in the remaining available time period as the target performance of the single cycle in the remaining available time period.

4. The method according to claim 2, wherein with the goal that the performance of the single cycle when the computing resources are operated in the remaining available time period approaches the target performance, assigning the cycles of the corresponding expected cycle numbers to the computing resource within the remaining available time period includes:

determining an effective operation time period of the computing resources within the remaining available time period; and with the goal that the performance of the single cycle when the computing resources are operated in the remaining available time period approaches the target performance, assigning the cycles of the corresponding expected cycle numbers to the computing resource within the effective operation period.

5. The method according to claim 1, wherein:

the performances of the computing resources in the application scenario are determined by statistically analyzing time consumed by the computing resources to process same sample data in the application scenario; and the performance of the computing resource is negatively correlated with time consumed by the computing resource to process the sample data.

6. The method according to claim 1, wherein:

the total performance of the computing resources when the computing resources are operated according to the expected cycle numbers is a weighted sum of the performances of the computing resources; and a weight of the performance of the computing resource is an expected cycle number of the computing resource.

7. The method according to claim 1, further comprising:

displaying a user interface; and receiving an inputted target available time period and a target number of available objects through the user interface.

8. A computing resource scheduling device, comprising:

at least one processor;

a determination module executing on the at least one processor, configured to, determine expected cycle numbers of computing resources used in an application scenario based on a first condition and a second condition, the first condition including that the computing resources are operated according to the expected cycle numbers to have an utilization rate of a remaining available object to be greater than a target utilization rate, and the second condition including that a total performance of the computing resources meets a threshold value when the computing resources are operated according to the expected cycle numbers, and a performance of any one computing resource is positively correlated with computing power of the computing resource; and a scheduling module executing on the at least one processor, configured to schedule and operate the computing resources in a remaining available time period according to the expected cycle numbers of the computing resources.

9. The device according to claim 8, wherein the scheduling module executing on the at least one processor, is further configured to:

obtain the total performance of the computing resources when being operated according to the expected cycle numbers;

determine the target performance of a single cycle within the remaining available time period according to the total performance; and with a goal that the performance of the single cycle when the computing resources are operated in the remaining available time period approaches the target performance, assign cycles of the corresponding expected cycle numbers to the computing resource within the remaining available time period.

10. The device according to claim 9, wherein the determination module executing on the at least one processor, is further configured to:

determine a ratio of the total performance to a number of cycles included in the remaining available time period as the target performance of the single cycle in the remaining available time period.

11. The device according to claim 9, wherein the scheduling module executing on the at least one processor, is further configured to:

determine an effective operation time period of the computing resources within the remaining available time period; and with the goal that the performance of the single cycle when the computing resources are operated in the remaining available time period approaches the target performance, assign the cycles of the corresponding expected cycle numbers to the computing resource within the effective operation period.

12. The device according to claim 8, wherein:

the performances of the computing resources in the application scenario are determined by statistically analyzing time consumed by the computing resources to process same sample data in the application scenario; and the performance of the computing resource is negatively correlated with time consumed by the computing resource to process the sample data.

13. The device according to claim 8, wherein:

the total performance of the computing resources when the computing resources are operated according to the expected cycle numbers is a weighted sum of the performances of the computing resources; and a weight of the performance of one computing resource is an expected cycle number of the computing resource.

14. The device according to claim 8, further comprising an interactive module configured to:

display a user interface; and receive an inputted target available time period and a target number of available objects through the user interface.

15. An electronic apparatus, comprising:

a processor; and a memory storing a program that, when executed by the processor, causes the processor to:

determine expected cycle numbers of computing resources used in an application scenario based on a first condition and a second condition, the first condition including that the computing resources are operated according to the expected cycle numbers to have an utilization rate of a remaining available object to be greater than a target utilization rate, and the second condition including that a total performance of the computing resources meets a threshold value when the computing resources are operated according to the expected cycle numbers, and a performance of any one computing resource is positively correlated with computing power of the any one computing resource; and schedule and operate the computing resources in a remaining available time period according to the expected cycle numbers of the computing resources.

16. The apparatus according to claim 15, wherein the processor is further configured to:

obtain the total performance of the computing resources when being operated according to the expected cycle numbers;

determine the target performance of a single cycle within the remaining available time period according to the total performance; and with a goal that the performance of the single cycle when the computing resources are operated in the remaining available time period approaches the target performance, assign cycles of the corresponding expected cycle numbers to the computing resource within the remaining available time period.

17. The apparatus according to claim 16, wherein the processor is further configured to:

determine a ratio of the total performance to a number of cycles included in the remaining available time period as the target performance of the single cycle in the remaining available time period.

18. The apparatus according to claim 16, wherein the processor is further configured to:

determine an effective operation time period of the computing resources within the remaining available time period; and with the goal that the performance of the single cycle when the computing resources are operated in the remaining available time period approaches the target performance, assign the cycles of the corresponding expected cycle numbers to the computing resource within the effective operation period.

19. The apparatus according to claim 15, wherein:

the performances of the computing resources in the application scenario are determined by statistically analyzing time consumed by the computing resources to process same sample data in the application scenario; and the performance of the computing resource is negatively correlated with time consumed by the computing resource to process the sample data.

20. The apparatus according to claim 15, wherein:

the total performance of the computing resources when the computing resources are operated according to the expected cycle numbers is a weighted sum of the performances of the computing resources; and a weight of the performance of the computing resource is an expected cycle number of the computing resource.

\* \* \* \* \*